Aug. 9, 1927.
C. M. PAULSON
1,638,508
STORM SHIELD FOR AUTOMOBILES
Filed Sept. 25, 1925
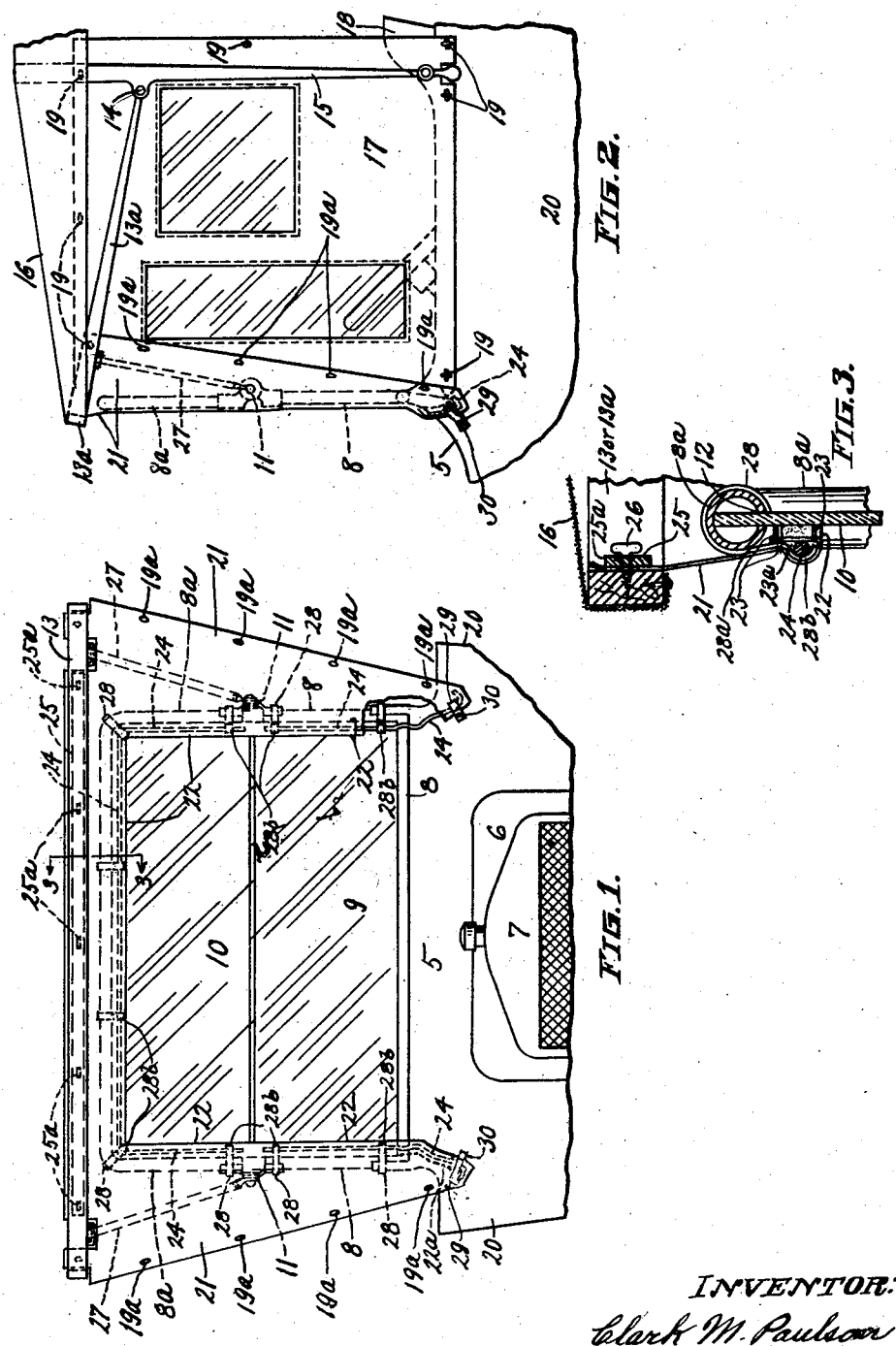
INVENTOR:
Clark M. Paulson
BY David E. Carlsen
ATTORNEY.

Patented Aug. 9, 1927.

1,638,508

UNITED STATES PATENT OFFICE.

CLARK M. PAULSON, OF MONTEVIDEO, MINNESOTA.

STORM SHIELD FOR AUTOMOBILES.

Application filed September 25, 1925. Serial No. 58,526.

My invention relates to detachable curtains for automobiles and more particularly to a curtain which might be more aptly called a storm shield readily attached to wind-shields of automobiles of the so-called open type. The object is to provide an efficient, simple and inexpensive storm shield detachably securable to the windshield and adjacent parts of an automobile.

In the accompanying drawing:

Fig. 1 is a front view of the upper part of an automobile and my storm shield in operative position thereon.

Fig. 2 is a left side elevation of Fig. 1 but showing a different type of automobile top and omitting the lower parts of Fig. 1.

Fig. 3 is an enlarged detail sectional view as on line 3—3 in Fig. 1, the cloth 21 shown as two parallel lines for clearness.

Referring to the drawing by reference numerals, 5 designates the cowl of an automobile, 6 the hood, 7 the radiator, 8 and 8ª the upright windshield frame of which 8 is the U-shaped lower frame and 8ª the inverted U-shaped upper frame in which are retained respectively the lower windshield glass 9 and upper glass 10, said lower frame 8 being rigid and the upper frame 8ª pivotally connected thereto by suitable joints 11. This construction is common to many automobiles and variable to some extent in different makes but in practically all instances the frame 8—8ª is of tubular material slitted on the inner sides for insertion and clamping of the windshield glass, as at 12 (see Fig. 3).

13 in Fig. 1 is the front end of the auto top frame in horizontal plane, the corresponding member 13ª in Fig. 2 being on a slight angle and forming the forward transverse end of a short U-shaped bow hinged with each end as at 14 to an upright top support 15. 16 in Fig. 1 is the usual fabric auto top, said top being omitted in Fig. 1 to more clearly expose my device. In Fig. 3 the usual method of fastening the cloth 16 to the top frame 13 is shown.

17 (Fig. 2) represents the removable front section of the usual type of side curtains for an automobile, made in quadrangular form and having spaced curtain fasteners known as snap buttons or turn buttons, 19, adjacent its edges to secure it to adjacent parts of the top 16, body 20, and to adjacent curtains (not shown). In the present manufacture of curtains 17 each such curtain has its front edge provided with eyelets adapted to be slipped over corresponding hooks (not shown) on the windshield frame and adjacent body parts. This provides a comparatively rain proof curtain but does not exclude cold air from entering the car in the spaces between said hooks where the edges of the curtain are apt to bulge more or less.

My device comprises a front curtain or shield designated as 21, of approximately inverted U-shape, its opening being smaller than the area of the windshield glass. In the use of my device the regular side curtain 17 is used and my shield preferably overlaps its forward part (at each side of the car) and is secured thereto by suitable curtain fasteners 19ª. The edges of my shield about its central opening are provided with padding strips 22 preferably of felt or other fibrous material fixed to the rearwardly exposed face of said edge portions of the shield. The curtain or shield and its strips 22 are preferably extended below the windshield frame in contact with the outer surface of the cowl or body of the car and follows the contour of said parts. That part of the shield secured to strip 22 is preferably doubled over inwardly to form a hem preferably stitched with a double row of stitches 23 going through both thicknesses of the hem and through the strip 22. Thus I form a continuous pocket 23ª between the two rows of stitches 23 for insertion of a metal rod 24 (see Fig. 3) adapted to be pressed against strip 22 by means presently to be described, thus holding the inner edges of shield 21 in airtight, weatherproof position against the glass of the windshield.

The upper edge of my shield is preferably held tight against the inner side of the auto top member 13 by a metal strip 25 with a number of spaced slots 25ª through which correspondingly spaced turn-buttons 26 (Fig. 3) fixed in member 13 project inwardly and are accessible to an occupant of the car. It is understood that the fabric of my shield has corresponding slots to 25ª so that its upper edge is first placed against member 13 then bar 25 clamped against it when the buttons 26 are turned at right angles to the slots 25ª of the bar 25.

27 in Figs. 1 and 2 indicate adjustable straps connecting each windshield joint 11 with the auto top bow 13 to hold the top in proper relative position to the windshield.

28 are a number of spring clamps each comprising a circular body portion adapted to frictionally engage the tubular windshield frame 8—8ᵃ and having a tangential integral arm 28ᵃ (see Fig. 3) terminating in a hook shape as at 28ᵇ. The entire hook, or clamp member, 28 is behind the cloth 21 but the hook 28ᵇ is within the pocket 23ᵃ some of the stitches 23 simply being omitted to let said hook be inserted. The inner curvature of each hook 28ᵇ normally engages bar 24 to press it toward the glass of the windshield. Thus is provided a series of spaced, spring pressed hooks bearing against bar 24 and padding 22 holding the latter tight against the glass and forming a weatherproof contact as previously described.

In Figs. 1 and 2 the bars 24 are clearly shown extending below the windshield frame and curved to conform with the contour of the cowl or car body, the lower end of each bar preferably extending rearwardly. Said extended lower part of bars 24 may each be held in place and pressed against the car by any suitable form of clip 29 detachably secured to the car body by a screw 30 or like means. It is understood that the padding 22 is preferably continued to the extremity of bar 24 and is pressed against the car body by said clip 29 (see dotted line 22ᵃ to left in Fig. 1).

The use of my device has been fully disclosed in the foregoing specification. It is obvious that my device may be used as a permanent attachment in cool or cold weather whether the regular side curtains of the auto are in use or not.

What I claim is:

1. A shield curtain of the class described for windshields of motor cars having a windshield frame, said curtain comprising a shield of flexible material cut in inverted U-shape, a padding strip secured to said material at its inner edges, means for pressing said padding strip against a windshield adjacent its frame, said padding strip comprising a fibrous compressible material and said means for pressing the same against the windshield consists of a number of spaced spring clamps each frictionally engaging the windshield frame, a sectional metal bar secured in the shield externally of said strip, each said spring clamp having an arm arranged to engage said bar and press it and the padding strip against the windshield.

2. The structure specified in claim 1 in which each said clamp comprises a gripping member adapted to frictionally engage the windshield frame and said arm of each clamp comprises a tangential extension with an open hook-shaped terminal adapted to engage and spring the bar toward the forwardly exposed surface of the vehicle windshield.

In testimony whereof I affix my signature.

CLARK M. PAULSON.